(12) United States Patent
Billonneau et al.

(10) Patent No.: US 11,115,449 B2
(45) Date of Patent: Sep. 7, 2021

(54) DATA CASTING

(71) Applicant: AIRMONT DataCast SAS, Ermont (FR)

(72) Inventors: Dominique Billonneau, Ermont (FR); Damien Jondeau, Ermont (FR); Sebastien Leroy, Ermont (FR); Stephane Touyet, Ermont (FR)

(73) Assignee: AIRMONT DataCast SAS, Ermont (FR)

( * ) Notice: Subject to any disclaimer, the term of this patent is extended or adjusted under 35 U.S.C. 154(b) by 29 days.

(21) Appl. No.: 16/580,107

(22) Filed: Sep. 24, 2019

(65) Prior Publication Data
US 2020/0162532 A1    May 21, 2020

(30) Foreign Application Priority Data

Nov. 19, 2018  (EP) .................................... 18206930

(51) Int. Cl.
| | |
|---|---|
| *H04L 29/06* | (2006.01) |
| *G06F 3/14* | (2006.01) |
| *H04L 29/08* | (2006.01) |
| *H04N 21/63* | (2011.01) |
| *H04N 21/41* | (2011.01) |

(Continued)

(52) U.S. Cl.
CPC ................ *H04L 65/60* (2013.01); *G06F 3/14* (2013.01); *H04L 63/10* (2013.01); *H04L 67/16* (2013.01); *H04L 67/32* (2013.01); *H04N 21/4122* (2013.01); *H04N 21/4126* (2013.01);

(Continued)

(58) Field of Classification Search
CPC ......... H04L 65/60; H04L 63/10; H04L 67/16; H04L 67/32; H04N 21/632; H04N 21/4122; G06F 3/14
See application file for complete search history.

(56) References Cited

U.S. PATENT DOCUMENTS 9,195,775 B2 *  11/2015  Al-Shaykh ....... H04N 21/26258
9,762,939 B2 *   9/2017  Bei ..................... H04N 19/895
(Continued)

FOREIGN PATENT DOCUMENTS

EP           2720470 A2     4/2014

OTHER PUBLICATIONS

European Search Report in corresponding European Patent Application No. 18206930 dated Jan. 25, 2019. 2 pages.
(Continued)

*Primary Examiner* — Thomas J Dailey
(74) *Attorney, Agent, or Firm* — Leason Ellis LLP

(57) ABSTRACT

According to the present subject matter, a cast request is received at a rendering system from a user device over a home network. The cast request is request for casting data from a cast device communicatively coupled to a first network and a third network, onto a display device communicatively coupled to the home network. Thereafter, the rendering system transmits the cast request to a casting system over a second network. In response transmitting the rendering system receives, from the casting system to the requested data. The data is provided to the casting system by the cast device and the data is obtained by the cast device over the first network. The available cast system is automatically discovered by the user device and no configuration or specific software is needed on the user device.

19 Claims, 5 Drawing Sheets

(51) Int. Cl.
*H04N 21/4227* (2011.01)
*H04N 21/436* (2011.01)
(52) U.S. Cl.
CPC ... *H04N 21/4227* (2013.01); *H04N 21/43615* (2013.01); *H04N 21/632* (2013.01)

(56) References Cited

U.S. PATENT DOCUMENTS

| | | | |
|---|---|---|---|
| 2015/0312648 A1* | 10/2015 | Zhang | H04N 21/8186 725/110 |
| 2016/0173937 A1* | 6/2016 | Shih | H04N 21/436 725/37 |
| 2017/0187773 A1* | 6/2017 | Chowdhury | H04L 65/4084 |
| 2017/0223408 A1* | 8/2017 | Asnis | H04N 21/4122 |
| 2018/0048590 A1* | 2/2018 | Gordon | H04L 63/10 |
| 2018/0192122 A1 | 7/2018 | Rajapakse | |
| 2018/0241609 A1 | 8/2018 | Rombakh et al. | |

OTHER PUBLICATIONS

Extended European Search Report in corresponding European Patent Application No. 18206930 dated Feb. 4, 2019. 8 pages.

\* cited by examiner

DATA CASTING

CROSS-REFERENCE TO RELATED PATENT APPLICATIONS

This application claims the benefit of priority of European Patent Application number 18206930.2 filed Nov. 19, 2018, which is incorporated by reference in its entirety herein.

BACKGROUND

Casting is a technique of controlling a media content being displayed on a computing device via another computing device. There may be two types of casting: In first type of casting, the first computing device may send an instruction to the second computing device indicating a media to be displayed. In such cases the second computing device retrieves the media from a source of the media. For example, the user may send an instruction, to a cast device coupled to the television, via his mobile device, to display a particular video. The cast device may thereafter retrieve the media from a source of the video, such YouTube, and thereafter may provide the video to the television to display the video.

EP 2720470 A2 discloses a data casting through a third-party aggregator. The third party aggregator aggregates the data from different devices and transmits it to the user device. The user device does not directly communicate with the casting device rather communicates with the aggregator.

US 2018/192122 A1 discloses transmitting data on various devices, such as a television, a home theater, etc., which are present in the same network. In other words, the US 2018/192122 A1 discloses an invention where a device is disclosed which acts as many to many hub for receiving and transmitting data.

Second type of casting, called screen mirroring, may be where a media being played on a first computing device is sent to a second display device or a computing device for being displayed on that device. In such cases, a source of the media is the first computing device.

SUMMARY

According to the present subject matter, a cast request is received at a rendering system from a user device over a home network. The cast request is request for casting data from a cast device communicatively coupled to a first network and a third network, onto a display device communicatively coupled to the home network. Thereafter, the rendering system transmits the cast request to a casting system over a second network. In response transmitting the rendering system receives, from the casting system to the requested data. The data is provided to the casting system by the cast device and the data is obtained by the cast device over the first network. The available cast system is automatically discovered by the user device and no configuration or specific software is needed on the user device.

BRIEF DESCRIPTION OF FIGURES

The following detailed description references the drawings, wherein.

DETAILED DESCRIPTION

Figure 1:
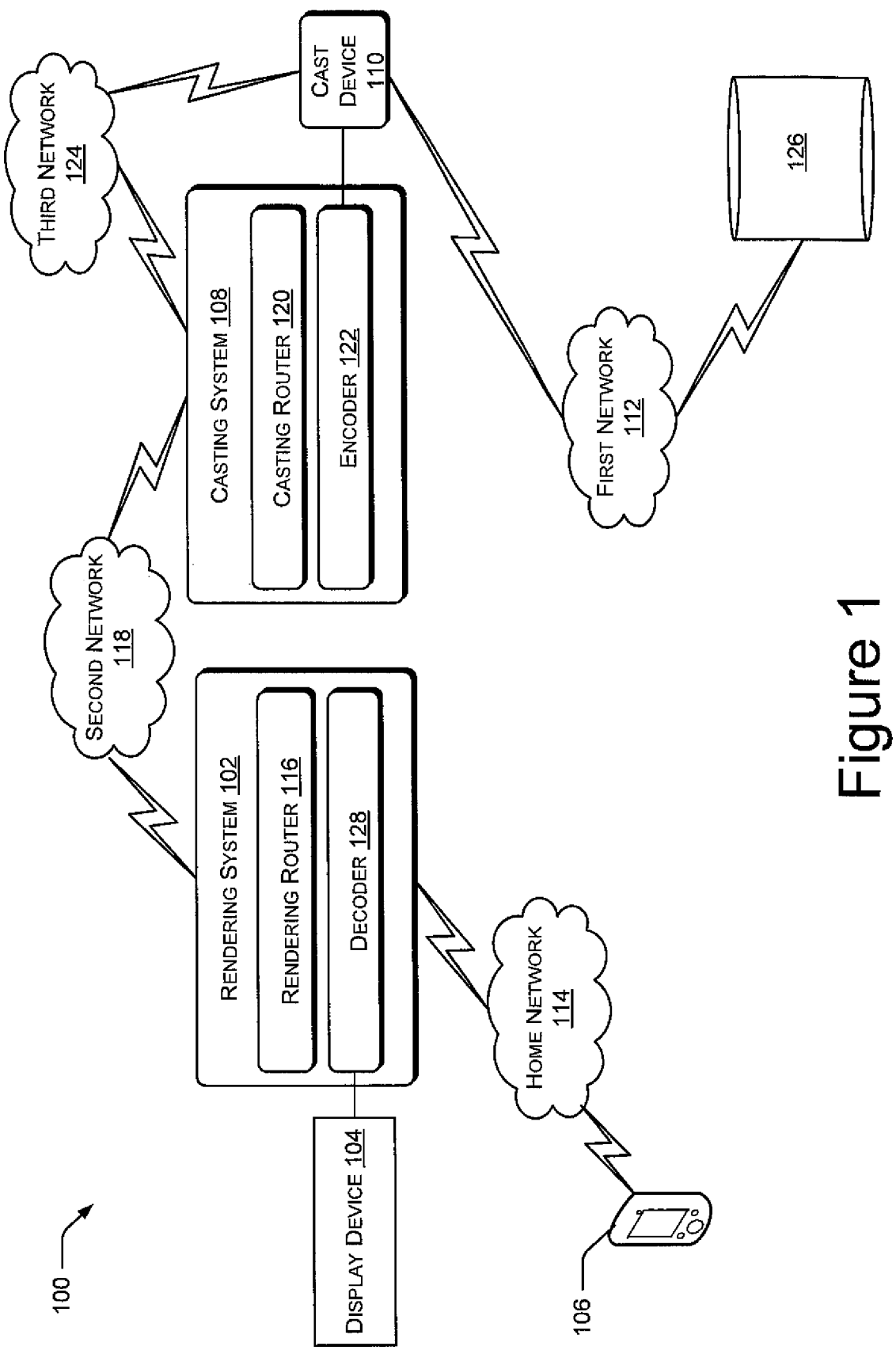
FIG. 1 illustrates a casting environment in accordance with an example implementation of the present subject matter.

In modern world, due to omnipresence of networks around, there have been considerable development in the way a media is distributed and displayed. Content casting is such a service in which a user device may send an instruction to a cast device which may instruct the cast device to retrieve a content from a source and thereafter display the content on a display device. For example, the user device may send an instruction to the cast device to play a video from YouTube. The cast device may access the video from the YouTube server via a network and may thereafter provide the video to a display device for display. In an example, the user device may be a mobile phone and the cast device may be a casting device, such as Chromecast.

The limitation of the above casting operation is that the casting operation cannot work when the cast device and the user device is in two separated networks. Discovery of cast device by the user device is based on multicast protocol like MDSN which, by construction, cannot work if the two devices are in separated network (cf RFC 6762 A host sending Multicast DNS queries to a link-local destination address (including the 224.0.0.251 and FF02::FB link-local multicast addresses) MUST only accept responses to that query that originate from the local link, and silently discard any other response packets). Further, for the above system to work the display device and cast device must remain in close vicinity as they may be coupled by a HDMI cable or others means.

The present subject matter discloses a casting environment where casting is possible even when the display device and the cast device are not in close vicinity. The casting environment comprises a casting system, a cast device, and a rendering system. The casting system retrieves a data while the rendering system renders the data on a display device. The cast device is present in a first network and is coupled with a display device via a second network. Further, the casting system is coupled with the cast device via a third network. When a user desires to cast a content on a display device which is not in the first network, the user couples the rendering system to the display device. The user further sends a cast request to the rendering system, over a home network and the rendering system transfers the cast request to the casting system over a second network. The casting system receives the cast request and transfers the cast request to the cast device over a third network. The cast device retrieves a data, corresponding to the content requested in the cast request, over the first network and provides the data to casting router. The casting router may further transmit the data to the rendering system. In another example, the cast device may provide the data to an encoder of the casting system. The encoder may encode the data and may provide the data to a casting router of the casting system. A casting router further transfers the data to a rendering router of the rendering system. The rendering router may provide the data to a decoder of the rendering system. The decoder may decode the data and may provide the data to a display device for display. Thus, the content is casted on the display device even if the display device is not in vicinity of the casting system. The user may permanently couple the casting system with the first network and may cast the content at some other place (at places where the first network is not available) using the rendering system. The casting system is coupled with the cast device without any modification of the cast device.

The above techniques are further described with reference to FIG. 1 to FIG. 4 It should be noted that the description and the Figures merely illustrate the principles of the present subject matter along with examples described herein and should not be construed as a limitation to the present subject matter. It is thus understood that various arrangements may be devised that, although not explicitly described or shown herein, embody the principles of the present subject matter. Moreover, all statements herein reciting principles, aspects, and implementations of the present subject matter, as well as specific examples thereof, are intended to encompass equivalents thereof. It should be understood that all networks mentioned in the current invention are compatible with any Internet Protocol (IP) as IPv4 or IPv6.

FIG. 1 shows a casting environment for casting of data on a display device 104. The network environment comprises a rendering system 102, the display device 104, a user device 106, a casting system 108, and a cast device 110. In an example, the display device 104 may be, a television, a light emitting display (LED), a liquid crystal display (LCD), a tablet. The display device 104 has been shown separately in FIG. 1, however, in an example, the display device 104 may be integrated with the rendering system 102 or the user device 106. Further, in an example, the user device 106 may be a mobile device, a laptop, a desktop or any other device which has casting capabilities.

The rendering system 102 is composed of a rendering router 116 and a decoder 128. For the sake of simplicity, the decoder 128 is represented in FIG. 1 as a separate entity, but it must be understood that the decoder 128 can be physically integrated in the rendering router, in the user device or in the display device. Moreover, the decoder 128 and the rendering router 116 can be located in separated network in the vessel. The decoder transmits the video to the display device by high-definition multimedia interface HDMI, video graphics array (VGA), universal serial bus (USB), internet protocol (IP) or any other means.

The cast device 110 of the present subject matter is coupled to a first network 112. In an example, the first network 112 may include, but are not limited to, Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NON), satellite network, and Public Switched Telephone Network (PSTN). Depending on the technology, the first network 112 includes various network entities, such as gateways, routers; however, such details have been omitted for the sake of brevity of the present description.

In an example, the display device 104 is in a home network 114. In an example, the home network may be present in user's home, a ship, a vessel, an airplane. The user wishes to cast data on the display device 104. In accordance with the example implementation of the present subject matter, the user couples the rendering system 102 with the display device 104. The rendering system 102 may be coupled to the display device 104 via connectors, such as HDMI, VGA, USB.

The user device 106 is coupled with the home network 114. The user device may automatically retrieve information about casting systems present the network environment (explained later with reference to FIG. 3). In an example, the user devices may use native functionality to retrieve information about cast device 110 present in the network environment. Thus, in an example, no additional application changes or hardware changes are necessary in the user device 106.

In another example, the cast device 110 may be automatically available in the home network 114. The casting system 108 may send the details, such as connections specifications to the rendering system 102 and the rendering system 102 may evaluate the casting system 108. In such cases, the rendering system 102 may send connection information about the home network 114 to the casting system 108. The casting system 108 may then allocate an IP to the cast device 110 that matches the one of the rendering routers 116. In other words, the rendering router 116 and the cast device 110 will have the same IP address. The IP address of the cast device may be dynamically changed in case of new IP address on the rendering router. This way, when user device 106 will retrieve the connection specification of the cast device 110, the latter will appear to be located in the home network 114. Communication from the user device 106 to the cast device 110 will be send to the rendering router 116. The rendering may thereafter transfer the data to the casting router 120. The casting router may forward the data to the cast device 110. Thus, the user device and the cast device will be able to communicate with one another as if they were in the same network. The user device 106 may be thereafter used by the user to select the casting system which he indents to use for casting data. The user device 106 sends the data to the casting system 108 via the rendering system 102. In an example, the user device 106 may scan the home network 114 to detect the rendering system 102 present in the home network 114. The user may, via his user device 106, authorize the rendering system 102 to communicate with the user device 106. Thereafter, the user, using the user device 106 sends a cast request to the rendering system 102 over the home network 114. In an example, the cast request may be understood as a request for casting a content on the display device 104. The cast request may comprise details, such as uniform resource locator of the content and identification (ID) of the casting system to which the cast request is directed to. The home network 114 is a network in which the user is currently present. The home network 114 may have similar configuration as of the first network 110.

After receiving the cast request from the user device 106, a rendering router 116 of the rendering system 102 transmits the cast request to the casting system 108 over a second network 118. The second network 118 may be a satellite network, internet network, intranet network, GPRS network etc. The first network 112 and the second network 118 are two distinct networks. In an example, the first network 112 and second network may be provided by two different service providers.

The casting system 108 comprises a casting router 120 and an encoder 122. The casting system 108 is further coupled to the cast device 110. In an example, the cast device 110 is coupled with the encoder 122 of the casting system 108 via a connection, such as HDMI, VGA etc. and the casting router 120 of the casting system 108 is coupled to the cast device 110 via a third network 124. The cast device 110 is further coupled with the first network 112. The cast request sent by the rendering system 102, over the second network 118, is received by the casting router 120.

The casting router 120 further transmits the cast request to the cast device 110, over the third network 124. In an example, there may be more than one cast device and the casting router 120, based on an identification formation received with the cast request, may determine a cast device to which the cast request should be directed to. In an example, the third network 124, may be similar have similar configuration as of the first network 112. In another example, there may not be a third network 124 and the casting system 108 may transfer the cast request to the cast device over the first network 112.

Upon, receiving the cast request, the cast device 110 analyzes the cast request and determines data to be retrieved. The cast device 110 determines the data to be retrieved based on the cast request. In an example, the cast request may comprise a uniform resource locator (URL) of the data to be retrieved and the cast device 110 may retrieve the data by accessing the URL. The cast device 110 may access a source 126, over the first network 112, to retrieve the data. In an example, the source 126 may be a database.

After the data is retrieved from the source 126, the cast device 110 may thereafter forward the retrieved data to the encoder 122 via the HDMI/VGA protocol/connection. The encoder 122 encodes the data and provides the data to the casting router 120. The casting router 120 transmits the encoded data to the rendering system 102. In an example, the casting router 120 may transmits data at a variable transfer rate. In an example, the casting system 108 may determine a transfer rate for the data based on various parameter, such as connection specifications, bandwidth of the network, format of data supported by the rendering system 102.

The rendering router 116 of the rendering system 102 receives the encoded data from the casting system 108 over the second network 118. The rendering router may thereafter provide the data to a decoder 128. The decoder 128 may decode the data and may thereafter forward the data to the display device 104. The display device 104 may display the data. In an example the data may be an audio stream, a video stream, or a combination of audio stream and audio stream, including additional information like subtitles, logo, additional audio streams etc. Further, as explained above the casting router 120 may send the data at a variable bit rate and thus, accordingly the rendering router 116 may receive data at a variable bit rate, in an example.

Consider an example, where a user travelling in a ship wishes to cast the data on a display device available on the ship. The network available on the ship may be referred to as home network.

The user wishes to cast the data from a cast device available in the user's home and which is coupled to a first network available in the user's home. The cast device at the user's home is also coupled with a casting system, such as the casting system 108. The user couples a rendering system (such as the rendering system 102) to the display device available in the ship. The user device will natively and automatically detect the cast device, and an icon will appear on the user device when a cast compatible application is used. By selecting the icon, the user sends a cast request to the rendering system. The rendering system transmits the cast request to the casting system over a satellite network which may be accessible from the ship. The casting system sends the cast request to the cast device. The cast device retrieves the data, over the first network, from a source and provides the data to the rendering system. The casting system thereafter transmits the data to the rendering system via the satellite network. The rendering system receives the data and forwards the data to the display device. Thus, the casting of the data is possible even when the cast device and the display device are in two different networks.

Figure 2:
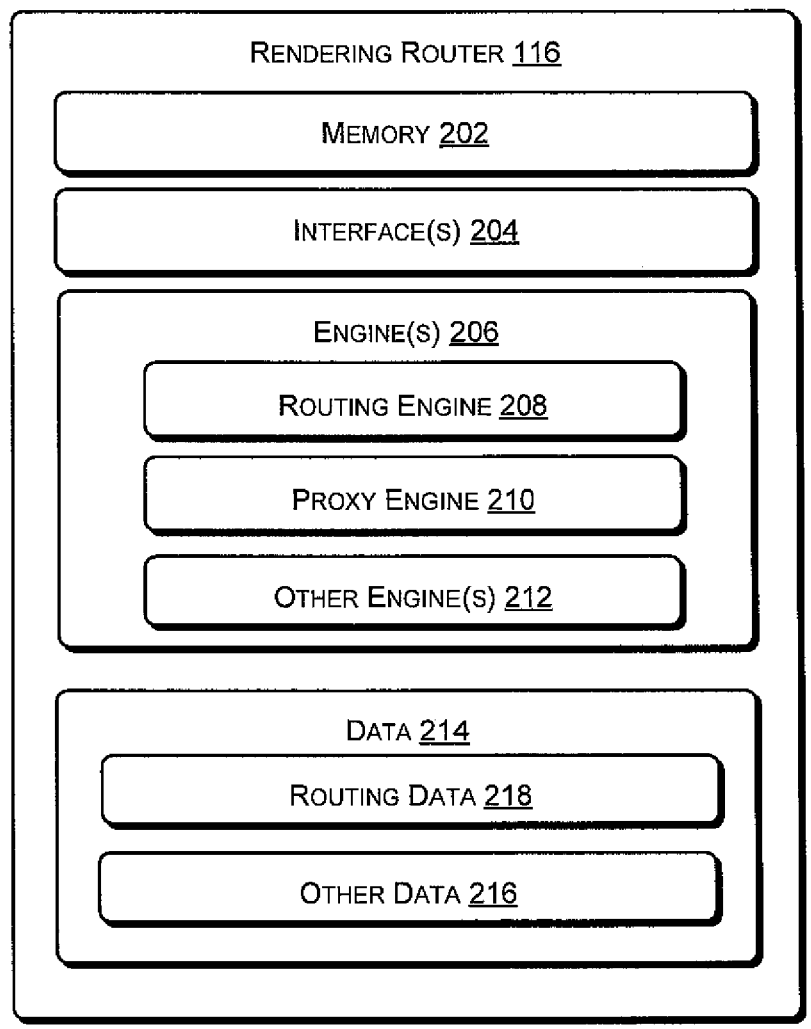
FIG. 2 illustrates a rendering router in accordance with an example implementation of the present subject matter.

FIG. 2 illustrates the rendering router 116, in accordance with an example of the present subject matter.

The rendering router 116, among other things, includes and a memory 202, interface(s) 204, and engine(s) 206. The memory 202 may include any computer-readable medium including, for example, volatile memory (e.g., RAM), and/or non-volatile memory (e.g., EPROM, flash memory, etc.). The interface(s) 204 may include a variety of software and hardware interfaces that allow the rendering router 116 to interact with other devices or other input/output (I/O) devices.

The engine(s) 206 may be implemented as a combination of hardware and programming (for example, programmable instructions) to implement certain functionalities of the engine(s) 206, routing of the cast request. In examples described herein, such combinations of hardware and programming may be implemented in several different ways. For example, the programming for the engine(s) 206 may be processor executable instructions stored on a non-transitory machine-readable storage medium and the hardware for the engine(s) 206 may include a processing resource (for example, implemented as either a single processor or a combination of multiple processors), to execute such instructions. In the present examples, the machine-readable storage medium may store instructions that, when executed by the processing resource, implement engine(s) 206.

In such examples, the rendering router 116 may include the machine-readable storage medium storing the instructions and the processing resource to execute the instructions, or the machine-readable storage medium may be separate but accessible to the rendering router 116 and the processing resource. In other examples, engine(s) 206 may be implemented by electronic circuitry. The engine(s) 206 may include a routing engine 208 and a proxy engine 210. In an example, the engine(s) 206 may also comprise other engine(s) 212 that supplement functions of the rendering router 116.

Data 214 serves, amongst other things, as a repository for storing data that may be fetched, processed, received, or generated by the engine(s) 406. The data 214 comprises other data 216 corresponding to the other engine(s) 212. In the illustrated example, the data 214 of also comprises routing data 218. In an example, the casting router 118 have a similar physical configuration as of the rendering router 116.

In operation, the cast request is received by the routing engine 208. The routing engine 208 may thereafter may retrieve a required address from the routing data 218 and may transmit the cast request to a casting system, such as the casting system 108. The routing engine 208 also receives the encoded data from the casting system 108. In an example, the routing engine 208 may use a proxy engine 210 to send the cast request and receive the encoded data. The proxy engine 210 acts an intermediary between the routing engine 208 and the casting system 108. Using the proxy engine 210 improves the response time of sending the cast request. The proxy engine 210 may store a cache of previously connected casting systems and may help in faster connection of the casting system 108 and the routing engine 208. The proxy engine 210 may also help in increasing the security of the data transmitted and received.

Figure 3:
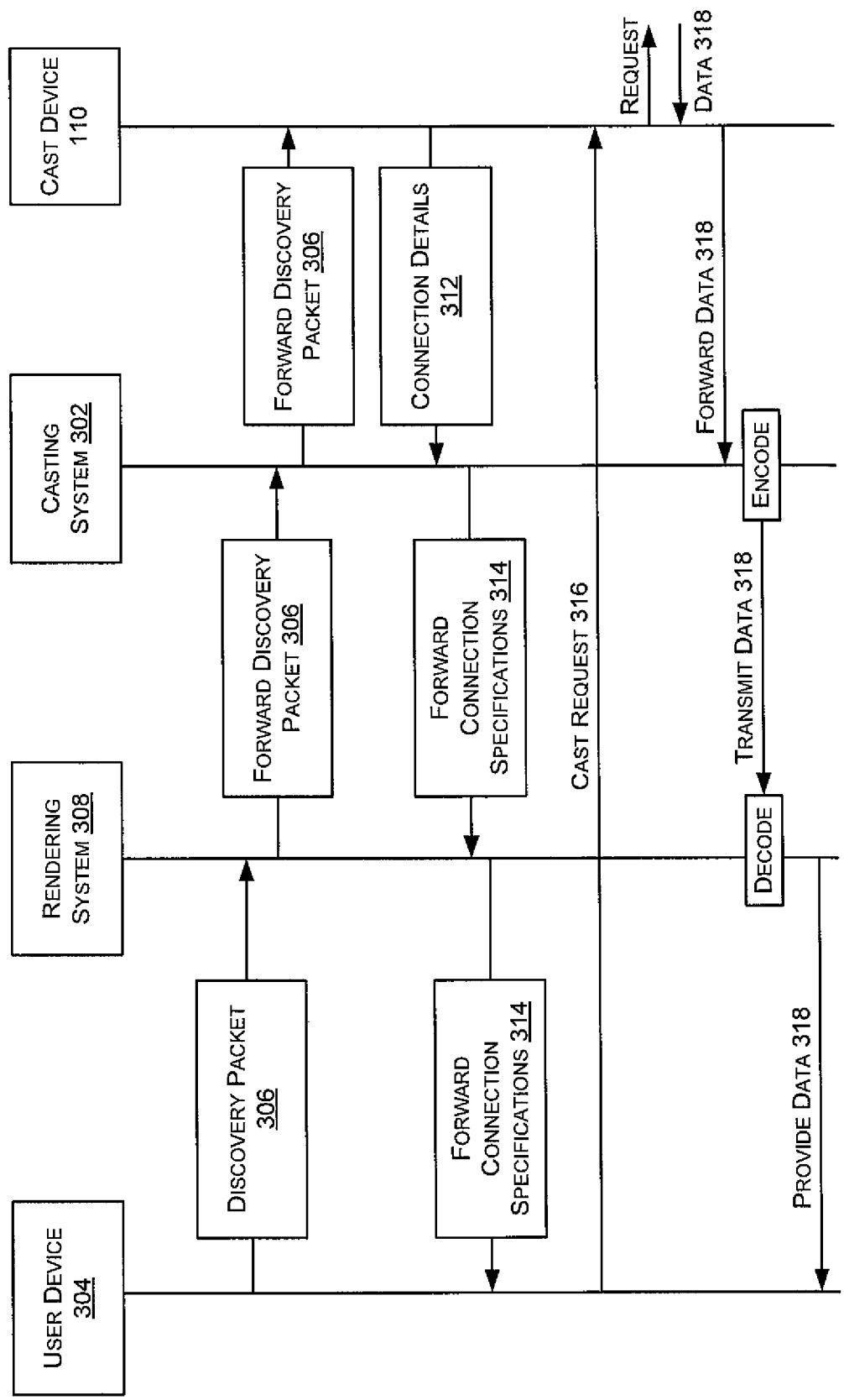
FIG. 3 illustrates a flow diagram for discovering casting system by a user device and receiving connection specifications of the cast devices.

FIG. 3 illustrates a flow diagram for discovering casting system 302 by a user device 304 and receiving connection specifications of the cast device. The casting system 302 is similar to the casting system 108 and the user device 106 is similar to the user device 304.

The user device 304 may use its native functionality to discover the casting system 302 present in the network and no change in application or hardware of the user device 304 is required. When a cast compatible application, such as Netflix, Prime video is running on the user device, the user device will request the user to allow for searching of the casting systems present in the network. The discovery of the casting systems may be based on the multicast protocol, such as mDSN, SSDP etc. First of all, the user device 304 sends a multicast discovery packet 306 on a home network. The rendering system 308 will receive the discovery packet 306 and will forward the discovery packet 306 to the casting system 304 via a second network, such as the second network 118. The casting system 304 may then forwards the discovery packet 306 to the cast device 110 over the third network. The cast device 310 in return would provide its connections details 312 to the casting system 304.

The casting system will receive the connection details 312 of the cast device. The casting system will thereafter forward its connection specifications 314, along with the connection details 312 of the cast device, to the rendering system 308 and the rendering system 308 will finally forward the connections specifications to the user device. It should be understood that, for simplicity, the flow diagram has been explained with reference to a single casting system 304 and there can be more than one casting systems and the discovery and receiving the connection specifications from each of such casting systems may follow a similar procedure, as described above.

After the user device 304 has discovered the casting system 302 and the cast device 110, the user device 304 may send a cast request 316 to the cast device 110. In response, the cast device 110 may request a source (not shown) to provide the requested data. The source may thereafter provide a data 318 to the cast device 110 and the cast device 110 may then forward the data 318 to the casting system 302. The casting system 302 encodes the data 318 and transmits the data 318 to the rendering system 308. The rendering system 308 decodes the data 318 and provide the data 318 to the user device 306.

Figure 4:
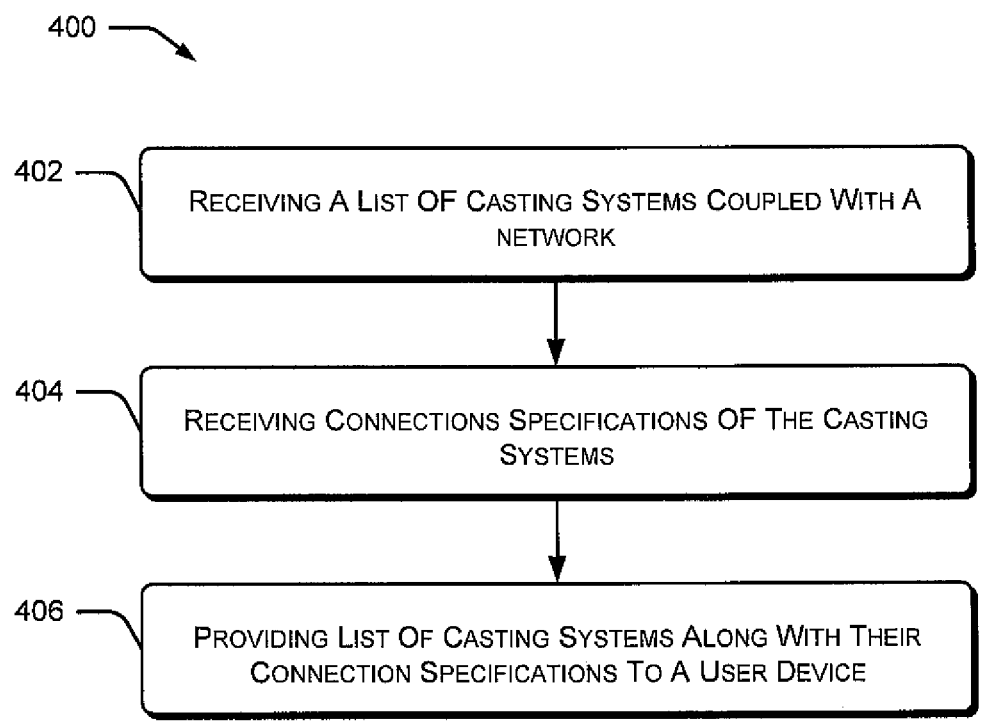
FIG. 4 shows a method of for determining a list of casting systems present in a network according to an example of the present subject matter.

FIG. 4 illustrates a method 400 for determining a list of casting systems in a network, in accordance with an example of the present subject matter. Although the method 400 may be implemented in a variety of routers, but for the ease of explanation, the present description of the example method 400 to provide suggestions is provided in reference to the above-described rendering router 116.

The order in which the method 400 is described is not intended to be construed as a limitation, and any number of the described method blocks may be combined in any order to implement the method 400, or an alternative method.

At block 402, the rendering router 402 receives a list of all casting systems coupled with a network, such as the second network 114. In an example, the rendering router 302 receive the list of casting systems form the casting router 118 which has automatically discovered the list of casting systems present in the network environment.

At block 404 the rendering router 404 receives connection specifications of each of the casting systems. The connection specification may indicate the protocols used by the casting systems for connecting to a network. In an example, the rendering router 402 may receive the connection specifications form the casting router 118.

At block 406, the rendering router 404 provides the list of casting systems along with their connection specifications to a user device, such as the user device 106 which may then use the casting system for casting a data on the display device 104.

Figure 5:
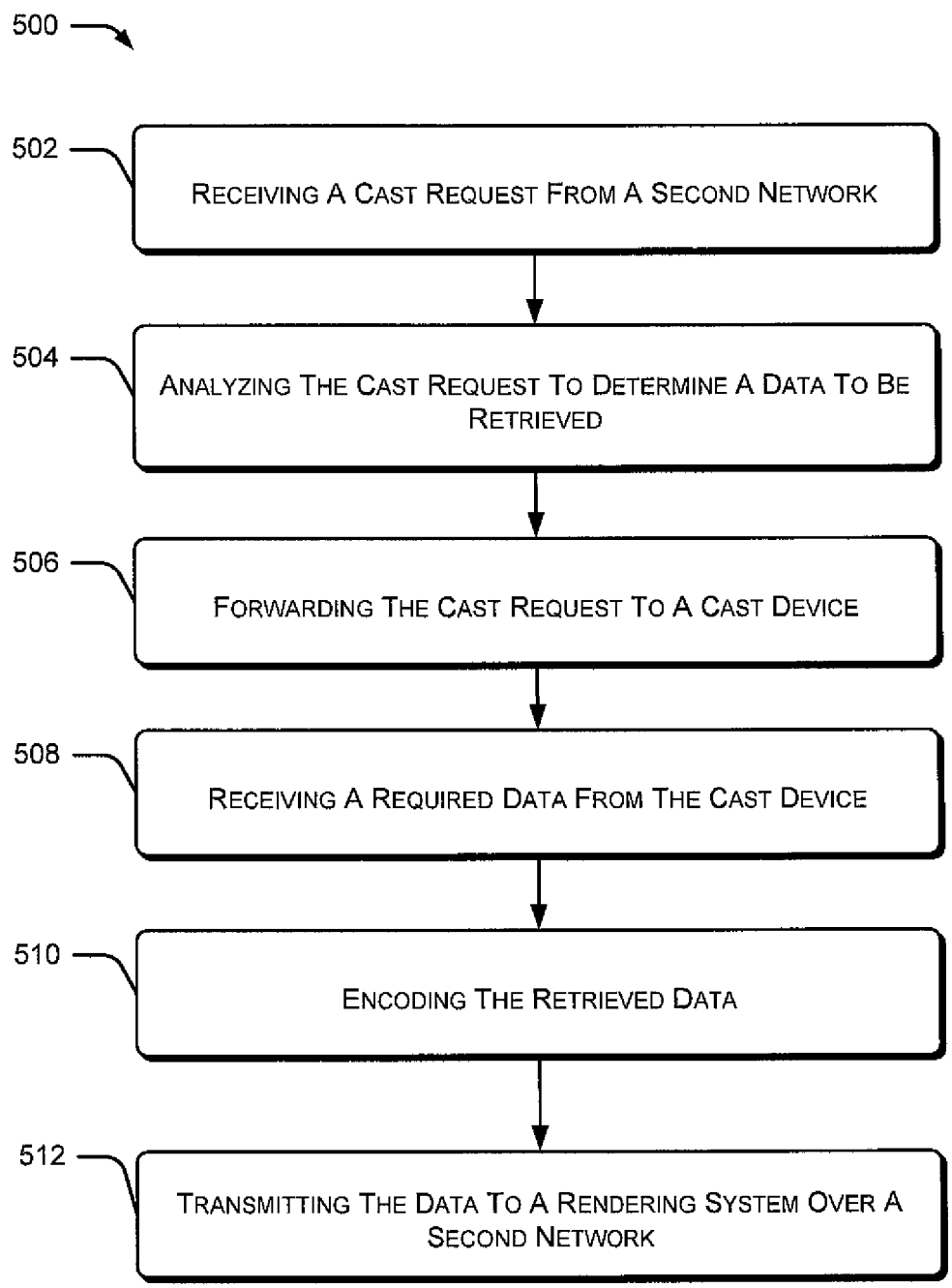
FIG. 5 shows a method of casting data according to an example of the present subject matter.

FIG. 5 illustrates a method 500 for casting data, in accordance with an example of the present subject matter. Although the method 500 may be implemented in a variety of casting system, but for the ease of explanation, the present description of the example method 500 to provide suggestions is provided in reference to the above-described casting system 108.

The order in which the method 500 is described is not intended to be construed as a limitation, and any number of the described method blocks may be combined in any order to implement the method 500, or an alternative method.

At block 502, a cast request is received by the casting system 108 over a second network, such as the second network 118. In an example, the cast request is received by a casting router, such as the casting router 120, of the casting system 108. In an example, the cast request may be initiated in a home network, such as the home network 114. The cast request may be initiated by a user device, such as the user device 106.

At block 504, the casting system 108 analyzes the cast request to determine a data to be retrieved. The cast request comprises details about the data to retrieved. In an example, the cast request may comprise a URL of the data to be retrieved.

At block 506, the casting system forwards the cast request to a cast device. In response to forwarding the cast request, the casting system 108 receives a required data from the cast device at block 508.

At block 510, the casting system 108 encodes the retrieved data based. At block 512, the casting system 108 sends the encoded data to the rendering system 102.

Thus, the methods and devices of the present subject matter provide techniques for casting of data. Although examples of casting data have been described in a language, specific to structural features and/or methods, it is to be understood that the description are not necessarily limited to the specific features or methods described. Rather, the specific features and methods are disclosed as example for casting data.

The invention claimed is:

1. A method comprising:
automatically discovering, by a user device using a native cast discovery functionality of the user device without requiring additional application or hardware changes, a cast device for a direct communication between the user device and the cast device, wherein a casting system is coupled to the cast device through a third network;
receiving, by a rendering router of a rendering system, a cast request over a home network from the user device, wherein the cast request is for casting data from the cast device, which is communicatively coupled to a first network and the third network, onto a display device communicatively coupled to the home network;
transmitting the cast request over a second network to the casting system;
receiving, at the rendering system, the requested casting data from the casting system, wherein the requested casting data is provided to the casting system by the cast device and the requested casting data is obtained by the cast device over the first network.

2. The method as claimed in claim 1, wherein the requested casting data is received at a variable bit rate.

3. The method as claimed in claim 1 wherein the user device connects to the rendering system for transmitting the cast request by:
scanning, via the user device, the home network to locate the rendering system;
authorizing the rendering system to communicate with the user device.

4. The method as claimed in claim 1, wherein the requested casting data is at least one of a) a video stream, b) an audio stream, and c) a combination of an audio stream and a video stream.

5. The method as claimed in claim 1 further comprising receiving, at the rendering system, a list of casting systems communicatively coupled to the second network along with connection specifications of the listed casting systems.

6. The method as claimed in claim 1, wherein the first network and the second network are two distinct networks.

7. A rendering system comprising:
a rendering router comprising:
a memory;
one or more interfaces; and
one or more processing devices coupled to the memory and adapted to execute instructions stored in the memory to:
receive, via the one or more interfaces over a home network, a cast request from a user device, wherein the cast request is for casting data from a cast device, which is communicatively coupled with a first network and a third network, onto a display device communicatively coupled to the home network;
transmit the cast request to a casting system over a second network, wherein the casting system is communicatively coupled with the cast device through the third network; and
receive, from the casting system, the requested casting data from the casting system,
wherein the requested casting data is provided to the casting system by the cast device,
wherein the requested casting data is obtained by the cast device over the first network, and
wherein the user device, using a native cast discovery functionality of the user device without requiring additional application or hardware changes, automatically discovers the cast device for a direct communication between the user device and the cast device.

8. The rendering system as claimed in claim 7, further comprising:
a decoder to decode the received data to generate a decoded data; and
a display device integrated with the rendering system, wherein the decoder sends the decoded data to the display device and the display devices displays the decoded data.

9. The rendering system as claimed in claim 7, wherein the rendering router receives, via the one or more interfaces, a list of casting systems communicatively coupled with the second network along with connection specifications of the casting systems and forwards, over the home network, the list of casting systems along with their connection specifications to the user device.

10. The rendering system as claimed in claim 7, wherein the first network and the second network are two distinct networks.

11. The rendering system as claimed in claim 7, wherein the home network is available in one of a ship, a moving vehicle, an airplane.

12. A method comprising:
automatically discovering, by a user device using a native cast discovery functionality of the user device without requiring additional application or hardware changes, a cast device for a direct communication between the user device and the cast device, wherein a casting system is coupled to the cast device through a third network;
receiving, by a casting router of the casting system, a cast request over a second network from the user device via a rendering system, wherein the cast request is for casting data from the cast device, which is communicatively coupled to a first network and the third network, onto a display device communicatively coupled with a home network;
transmitting the cast request to the cast device;
receiving, from the cast device, the requested casting data corresponding to the cast request wherein the requested casting data is retrieved by the cast device over the first network;
transmitting the requested casting data to the rendering system over the second network.

13. The method as claimed in claim 12 wherein the cast request comprises a uniform resource locator (URL).

14. The method as claimed in claim 12, wherein the cast request is transmitted to the cast device over one of the first network and the third network.

15. The method claimed in claim 12, wherein the first network and the second network are two distinct networks.

16. A casting system comprising:
a casting router comprising:
a memory;
one or more interfaces; and
one or more processing devices coupled to the memory and adapted to execute instructions stored in the memory to:
receive a cast request from a user device via a rendering system over a second network, wherein the cast request is a request for casting data from a cast device to a display device present in a home network, and wherein the cast device is present in a first network;
transfer the cast request to the cast device;
receive the requested casting data from the cast device
transmit the requested casting data corresponding to the cast request over the second network to the rendering system,
wherein the user device, using a native cast discovery functionality of the user device without requiring additional application or hardware changes, automatically discovers the cast device for a direct communication between the user device and the cast device.

17. The casting system as claimed in claim 16 wherein the casting system comprises an encoder to encode to the data prior to transmitting the data.

18. The casting system as claimed in claim 16, wherein the second network is a satellite network.

19. The casting system as claimed in claim 16, wherein the casting system transmits the data at a variable bit rate.

* * * * *